July 5, 1949.  E. W. EWESON  2,474,833
METHOD FOR MAKING ORGANIC FERTILIZER
Filed Feb. 27, 1946  2 Sheets-Sheet 2

INVENTOR.
Eric W. Eweson
BY Emery, Varney, Whittemore &c.
ATTORNEYS

Patented July 5, 1949

2,474,833

UNITED STATES PATENT OFFICE 2,474,833

METHOD FOR MAKING ORGANIC FERTILIZER

Eric W. Eweson, New York, N. Y.

Application February 27, 1946, Serial No. 650,610

2 Claims. (Cl. 71—9)

This invention relates to methods for the making of organic fertilizer from organic waste materials.

It is an object of the invention to provide methods for increasing the rapidity of propagation of aerobic bacteria in a mass of moist organic material, whereby the decomposition of the organic material and the preparation of a completed fertilizer product may be hastened.

It is a further object of the invention to provide for drying of those portions of the moist, decomposing mass in which decomposition has proceeded to the desired extent, in order to prepare a finished product of such dryness that further development of bacteria is arrested until the fertilizer product is added to the soil or is again moistened.

It is a further object of the invention to provide apparatus in which the said methods may be carried out.

Other objects and advantages of the invention will appear hereinafter.

A preferred embodiment of apparatus suitable for carrying out said methods is shown in the accompanying drawings, in which, Figure 1 is a vertical section through the apparatus.

Figure 1:
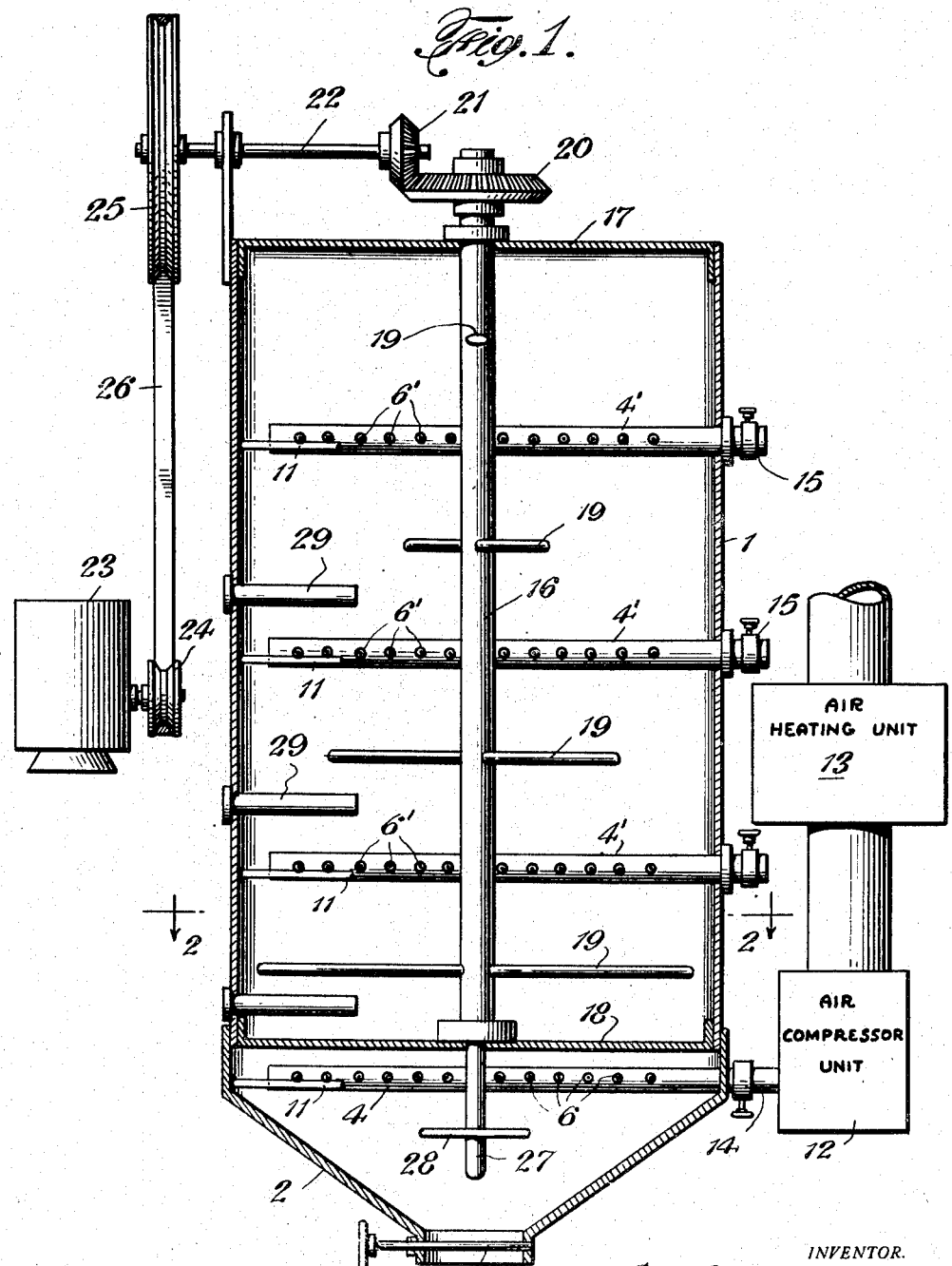
Figure 2:
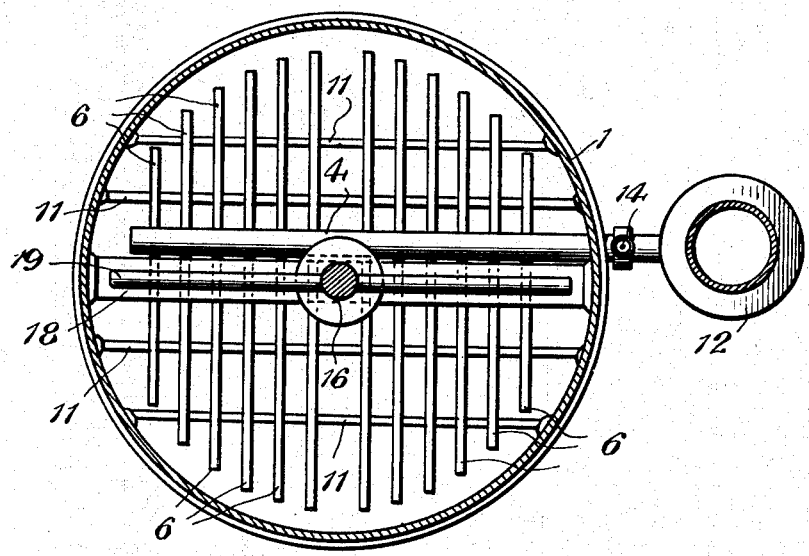
Figure 2 is a section on the line 2—2 of Figure 1.

In practicing my invention I use one or more of the organic materials now commonly used for the purpose, such materials usually being waste or refuse materials which are of little or no value for other purposes. Suitable materials include garbage, sludge, manure, waste and refuse from canning, fishery and sugar mills, refuse and waste from distilleries and breweries, weeds, straw, tobacco stems, wood wastes, peat and the like.

Such materials usually contain sufficient moisture for efficient fermentation, i. e. a moisture content preferably in the neighborhood of 50% to 60%, although satisfactory results may be obtained with a moisture content as low as 40% or as high as 80%. Comparatively dry materials are advantageously mixed with very wet materials to obtain a preferred moisture content at the mass.

Such organic materials are first subjected to a cutting or grinding operation to reduce the size of the pieces of solid material to uniform, relatively fine condition, and the cut or ground mass is then inoculated and thoroughly mixed with a seed stock of aerobic soil bacteria in accordance with known practice. If desired, certain nutrients and minerals such as nitrates, urea, ammonium salts, phosphates, lime and the like may also be added at this time, in accordance with known practice.

In the past, it has been the practice for centuries to convert organic materials into soil fertilizers by composting, the organic materials being inoculated with stable manure, fertile garden soil or other compost material. In composting it has been recognized that aeration of the decomposing mass was important, and aeration has usually been effected merely by occasionally turning over a portion of the heap, although in some cases grilled receptacles have been provided which assist aeration of the mass. The desirability of temperature control has also been recognized, and in some cases crude methods such as covering the heap with straw or burlap have been used to advantage.

In composting, however, decomposition proceeds relatively slowly even under the best of conditions. More recently improved methods and apparatus have been proposed and used in which the conditions are better suited to induce rapid decomposition, and in which the conditions may be controlled to some extent. In the apparatus referred to, moist organic material, properly inoculated, is fed to a digester containing a series of spaced, superposed decks, each of which is adapted to contain a layer of material about a foot thick. Air is introduced into the digester between the decks so that the surface of each layer of organic material is exposed thereto. Mechanical means such as plows are provided for stirring the material on the decks and for causing the material to move successively downward from one deck to the next lower deck. Digesters of this type are, however, relatively expensive, and the mechanical complications are considerable. The rate of propagation of bacteria is also relatively slow, due to the fact that aeration is uneven, the exposed surface portions of the material being excessively aerated while the unexposed portions suffer from inadequate air supply, both of which conditions hamper optimum development of aerobic bacteria. Since the fertilizing value of the end product depends primarily on the synthesis and accumulation of micro organic protoplasm, in which are contained the nutrients needed by the plants, fermentation must be as efficient as possible. This cannot be satisfactorily and quickly accomplished by presently known methods.

According to the present invention I place a mass of moist, inoculated organic material in a tank or container adapted to enclose and support the same, and I force air under pressure through said mass from underneath in order to furnish an adequate and controlled supply of air to all portions of the mass, the flow of air and the temperature of the air being controlled to provide conditions best suited for efficient propagation of bacteria and for subsequent drying of the mass.

Furthermore I withdraw spent air, i. e. air in which oxygen and in some cases the nitrogen content has been substantially reduced, and gases which may be generated during the fermentation process, notably excess carbon dioxide, from a plurality of points spaced at intervals throughout the mass.

Furthermore, I may, when desirable, agitate the mass slightly as decomposition proceeds to break up air channels to facilitate the uniform distribution of fresh air to all portions of the mass, and to facilitate the withdrawal of spent air and generated gases as previously referred to.

The fresh air which is forced through the mass is preferably preheated to a temperature best suited for optimum propagation of the various strains of aerobic bacteria contained in the mass. Such temperature may be between 90° F. and 150° F. depending on the stage of fermentation, the particular type of microbic development to be stimulated, the degree of drying desired, and on other conditions as observed by the operator.

No satisfactory fixed rule may be laid down as to the quantity of air introduced, for this will also vary depending on the nature of the materials and the stage of fermentation, but it may be noted that the quantity of air required is much less than that customarily used in the prior process above referred to. In general, it may be said that ½ cubic foot of air per minute per cubic foot of material is the maximum permissible volume of air, and the volume used to facilitate optimum aerobic fermentation will vary within this maximum depending on conditions. A skilled operator, observing the process of the fermentation, will be able to adjust the temperature, quantity and distribution of air as required for efficient operation, it being important to note that any excessive blowing of air through the fermenting mass hampers optimum development of aerobic bacteria by disturbing the osmosis and by preventing the slight accumulation of carbon dioxide desired as an aid in dissolving nutrient minerals needed by the bacteria. The carbon dioxide content in the spent air withdrawn is, in fact, a good indication of proper aeration and fermentation, for when the carbon dioxide content is only around 1% it is a sign of poor fermentation, which may well be due to excessive aeration.

After fermentation and decomposition has proceeded to the desired point, which will first occur in the lower part of the tank, rapid drying of this material is desired and is greatly facilitated by continuing to force air under pressure through this mass of material. This more or less humid air will not be spent air and will benefit the next layers of the material in the same way as fresh air.

Referring to the drawings, which illustrate a preferred embodiment of apparatus for carrying out the method described, and from which a more complete understanding of said method may be had, I provide a large tank 1, preferably cylindrical in shape, having an open top into which the organic material may be fed as desired, and having a closed conical bottom 2 provided with a valve 3 through which the finished fertilizer may be discharged.

Figure 3:
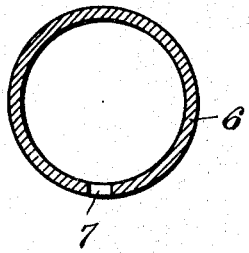
Figure 3 is an enlarged section through one of the air distributor pipes.
Figure 4:
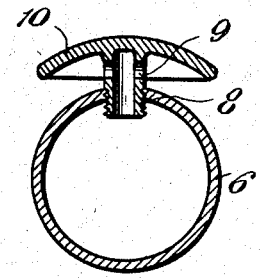
Figure 4 is a similar view showing a modified form of air distributor pipe.

An air distributor 4 is located in the lower part of the tank, extending horizontally across the tank. This distributor may be of any suitable design, but as shown consists of a header having a series of distributor pipes 6 projecting therefrom, each of said distributor pipes having a series of small air vents 7 drilled therein, preferably on the under side, as shown in Figure 3, so that said holes are less likely to become clogged by the mass of material above. Alternatively, larger holes may be drilled in the upper side of the pipes 6 in each of which may be mounted a fitting, as shown in Figure 4, comprising a tube 8 having air vents 9 covered and protected by the head 10. The distributor pipes may be supported by suitable cross bars 11.

The air distributor is connected to a compressor unit 12, which is turn, may be connected to a heating unit 13 in which the incoming air may be heated as described to maintain the desired temperature. The rate of flow of air to the distributor may be controlled by valve 14.

The withdrawal of spent air and generated gases is accomplished through one or more air collectors 4', designed like air distributor 4, and having collection pipes 6' similar to pipes 6, said air collectors extending horizontally across the tank at suitably spaced intervals, the withdrawal being controlled by valves 15.

Although there will be a continuous downward shifting of the mass of material in the tank as a result of the dehydration and decomposition of the material, and as a result of the periodic withdrawal of finished material, it may be desirable, especially in tanks of considerable height, to provide for additional agitation or stirring of the material. This may be accomplished by supporting a vertical shaft 16 in upper and lower cross bars 17 and 18, said shaft carrying a plurality of arms 19, spaced at suitable intervals along the shaft. This agitator is mounted for relatively slow rotation in the tank in any suitable manner, as by bevel gears 20 and 21 from the shaft 22 which may be driven by the motor 23 through pulleys 24 and 25 and belt 26. If desired the shaft may be provided with an extension 27 carrying a bar 28 to stir the ready material below air distributor 4 to facilitate discharge of this material through valve 3.

The tank may also be provided with a plurality of sampling ports 29 consisting of short pieces of pipe extending inwardly, through which the material may be sampled and the temperature observed from time to time. Such ports are normally closed during the operation and are only opened from time to time as required.

In carrying out the process with the apparatus described, a mass of inoculated organic material is placed in the tank and air under suitable pressure is forced through the mass by the compressor unit, the air being well distributed by the distributor 4, and the temperature of the incoming air being controlled as required. As fermentation proceeds withdrawal of spent air and generated gases in controlled by valves 15. For example, if all of the valves 15 are closed, all of the incoming air is forced upward through the entire mass and the spent air and generated gases will escape at the top of the tank. On the other hand, if one or more of the valves 15 are opened, part of the air and generated gases will be withdrawn through the exit passages thus provided. As decomposition proceeds, a skilled operator, observing the conditions at various levels within the tank, will adjust the valves 15 in such manner that the distribution and withdrawal is properly adjusted to the requirements of the mass at various levels.

The method may be practiced as a batch operation but is preferably practiced as a continuous operation. In the latter, of course, the fertilizer is removed either continuously or periodically from the bottom and new material is added continuously or periodically at the top.

At the very beginning of a continuous operation, the material in the bottom of the tank below the air distributor would receive substantially no treatment, of course, and as discharged from the tank would either be discarded or returned to the top of the tank for treatment. As the operation begins, decomposition should be most active in the layer immediately above the air distributor, and at this stage the valve 15 of the lowest air collector would be opened comparatively widely. As decomposition proceeds, however, the continued introduction of fresh air begins to dry the lowest material, and as drying proceeds, decomposition will be progressively inhibited. As this occurs the valve of the lowest air collector may be closed, thus forcing the air to pass into the layer next above, and the valve 15 controlling withdrawal of air from this layer would be opened. Alternatively, instead of closing the valve 15 controlling the withdrawal of air from the lowest layer, this valve may be left open, and the volume of air introduced through the valve 14 may be increased to force the air into the layer above. This has the advantage of hastening drying of the material in the lowest layer. In no case, however, should the volume of air forced into the upper layers where decomposition is taking place exceed the permissible maximum above set forth. As final drying of the lower layer proceeds, however, decomposition becomes so limited that the air reaching the layer above is substantially fresh air, although it is somewhat humidified by its passage through the lower layer. Gradually, in this way, by controlling the valves 15, fresh air is forced higher and higher until substantially all of the contents of the tank are under treatment, the lower layers being dried and the upper layers being a a state of progressive decomposition from the top toward the bottom. After a state of equilibrium is established, finished dried fertilizer may be withdrawn from the bottom of the tank and additional new material may be added to the top of the tank from time to time. Throughout the operation, as previously explained, the valves 15 may be adjusted from time to time to suit the requirements of the mass at various levels.

It will be understood that the invention may be variously modified and embodied within the scope of the subjoined claims.

I claim as my invention:

1. The method of making organic fertilizer by the decomposition of moist organic material through the propagation of aerobic bacteria therein which comprises continuously forcing air under pressure through an enclosed mass of such material, all of said air being introduced into the mass from the bottom thereof, and continuously withdrawing spent air which has passed through the mass and gases generated within the mass at vertically spaced intervals throughout the mass.

2. The method of making organic fertilizer by the decomposition of moist organic material through the propagation of aerobic bacteria therein which comprises continuously forcing air under pressure through an enclosed mass of such material, all of said air being introduced into the mass from the bottom thereof, continuously withdrawing spent air which has passed through the mass and gases generated within the mass at vertically spaced intervals throughout the mass, and continuously agitating the mass to facilitate the distribution of fresh air throughout the mass and the withdrawal of spent air and generated gases throughout the mass.

ERIC W. EWESON.

REFERENCES CITED

The following references are of record in the file of this patent:

UNITED STATES PATENTS

| Number | Name | Date |
| --- | --- | --- |
| 1,597,724 | Cooke | Aug. 31, 1926 |
| 2,043,265 | Roeder | June 9, 1936 |
| 2,178,818 | Earp-Thomas | Nov. 7, 1939 |
| 2,209,613 | Roeder | July 20, 1940 |
| 2,285,834 | Proctor | June 9, 1942 |